(12) United States Patent
Saini et al.

(10) Patent No.: US 11,551,194 B2
(45) Date of Patent: *Jan. 10, 2023

(54) SYSTEM TO FACILITATE EXCHANGE OF DATA SEGMENTS BETWEEN DATA AGGREGATORS AND DATA CONSUMERS

(71) Applicant: Adobe Inc., San Jose, CA (US)

(72) Inventors: Shiv Kumar Saini, Bangalore (IN); Ritwick Chaudhry, Pittsburgh, PA (US); Harvineet Singh, Ludhiana (IN); Bhavya Bahl, Atlanta, GA (US); Sriya Sainath, Bhubaneswar (IN); Savya Sindhu Gupta, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/449,124

(22) Filed: Sep. 28, 2021

(65) Prior Publication Data

US 2022/0012703 A1  Jan. 13, 2022

Related U.S. Application Data

(63) Continuation of application No. 16/788,841, filed on Feb. 12, 2020, now Pat. No. 11,151,532.

(51) Int. Cl.
*G06Q 30/00* (2012.01)
*G06Q 20/12* (2012.01)
(Continued)

(52) U.S. Cl.
CPC ....... *G06Q 20/123* (2013.01); *G06F 16/2379* (2019.01); *G06N 7/005* (2013.01);
(Continued)

(58) Field of Classification Search
CPC ............. G06Q 20/123; G06Q 30/0206; G06Q 30/0611; G06F 16/2379; G06N 7/005
See application file for complete search history.

(56) References Cited

U.S. PATENT DOCUMENTS

2003/0069780 A1  4/2003  Hailwood et al.
2007/0203893 A1  8/2007  Krinsky et al.
(Continued)

OTHER PUBLICATIONS

Vastani, Saloni Firasta, and Kent Bourdon Monroe. "Role of customer attributes on absolute price thresholds." Journal of Services Marketing (2019).*

(Continued)

*Primary Examiner* — Kathleen Palavecino
(74) *Attorney, Agent, or Firm* — Finch & Maloney PLLC

(57) ABSTRACT

Techniques for exchanging data segments between data aggregators and data consumers. In an embodiment, a value of an arbitrary data segment selected by a data consumer is computed. In particular, an individual user value is calculated for each user represented in the data segment, wherein the individual user value is a weighted sum (or other function) of the one or more features of the data segment attributable to that user, plus an additive gaussian noise. The overall value of the data segment is the sum of the individual user values. An offer price for the data segment can then be calculated using the overall value. Once a request is received from the consumer to purchase the data segment at the offer price, the data segment can be exchanged between the aggregator and consumer. Thus, a data marketplace or platform for the exchange of data segments is enabled.

20 Claims, 10 Drawing Sheets

(51) Int. Cl.
  *G06F 16/23* (2019.01)
  *G06N 20/00* (2019.01)
  *G06Q 30/06* (2012.01)
  *G06N 7/00* (2006.01)
  *G06Q 30/02* (2012.01)

(52) U.S. Cl.
  CPC ......... *G06N 20/00* (2019.01); *G06Q 30/0206* (2013.01); *G06Q 30/0611* (2013.01)

(56) References Cited

U.S. PATENT DOCUMENTS

| | | |
|---|---|---|
| 2014/0078912 A1 | 3/2014 | Park et al. |
| 2015/0081393 A1 | 3/2015 | Cohen et al. |
| 2015/0148700 A1 | 5/2015 | Mhuircheartaigh et al. |
| 2015/0302467 A1 | 10/2015 | Marenko |
| 2016/0232583 A1 | 8/2016 | Testa |
| 2017/0286909 A1 | 10/2017 | Baynes |

OTHER PUBLICATIONS

Adobe Audience Manager Product Documentation, "Audience marketplace for data buyers", retreived from the Internet: https://helpx.adobe.com/audience-manager/how-to/aam-marketplace-data-buyers.html [retreived Jan. 10, 2019] 4 pages.

Cohen, M. et al., "Feature-based dynamic pricing", In Proceedings of the 2016 ACM Conference on Economics and Computation, 2016, 45 pages.

Cui, T. et al., "Data-driven reserve prices for social advertising auctions at linkedin", In Proceedings of the ADKDD'17, Aug. 14, 2017, 7 pages.

Hinton, G. et al., "Reducing the dimensionality of data with neural networks", Science, Jul. 28, 2006, vol. 313, pp. 504-507.

Salesforce, "Meet data studio", retreived from the internet: https://www.salesforce.com/products/marketing-cloud/data-sharing [retreived Jan. 10, 2020] 10 pages.

Salesforce, "Oracle data marketplace", retrieved from the Internet: https://docs.oracle.com/en/cloud/saas/data-cloud/data-cloud-help-center/AudienceDataMarketp . . . [retrieved Jan. 10, 2020] 11 pages.

* cited by examiner

SYSTEM TO FACILITATE EXCHANGE OF DATA SEGMENTS BETWEEN DATA AGGREGATORS AND DATA CONSUMERS

CROSS REFERENCE TO RELATED APPLICATIONS

This application is a continuation of U.S. patent application Ser. No. 16/788,841 (filed 12 Feb. 2020), the entire disclosure of which is hereby incorporated herein by reference.

BACKGROUND

Data marketplaces include systems, processes, and other computing platforms that conveniently bring together data sellers (aggregators) and data buyers (consumers). The monetization of raw data collected from online sources is a significant source of revenue for many companies and online services. As with the trading of any commodity, a price must be set before a trade can be realized. Most data marketplaces rely on the seller to set a price for the data to be exchanged. While there are a number of platforms that can allow this data exchange to occur, none of them provide a technical solution for pricing an arbitrary segment of data. Rather, a data seller typically only sets pricing for a broad set of bulk data, given the laborious and impractical nature of pricing each smaller arbitrary data segment that might be requested by a potential buyer. To this end, there is a lack of a technical solution for efficiently pricing an arbitrary data segment of a larger bulk data set, which in turn results in a constraint on data segments that a data consumer can choose and purchase.

This inability to price data segments is largely due to a number of difficult and unaddressed technical problems related to a data marketplace. First, while there are various pricing mechanisms used for pricing of a commodity, such as online auctions, seller posted prices, and prediction markets or so-called crowd sourcing, none of these approaches are suitable for setting the price of data. Second, data is a non-standard commodity, in that it is freely replicable, and any subsets of data can be potentially valuable. Third, while the seller can control and set pricing, finding the "sweet spot" that maximizes revenue to the seller and that is also acceptable to a buyer (to the point where the buyer will go forward with the purchase) is quite difficult. Given the substantial lack of transparency, the pricing function is simply not recoverable from the observed data. Fourth, pricing of a data segment requires past data on the trades. However, as previously noted, such historical data does not exist.

Furthermore, note that the way data is made available in the marketplace impairs the ability to accurately set a price for data of interest to a consumer. In more detail, data is generally offered for sale by two types of aggregation entities: (1) entities that receive and aggregate data directly from users of their resources; and (2) third-party entities that receive and aggregate data from multiple sources. Entities that receive and aggregate data directly from users either don't offer the ability to assign a market price to the data, or if they do, the price is set arbitrarily and exclusively by that entity. As explained above, such seller-based pricing is susceptible to either a price that is either too high for the consumer (in which case no sale is made), or too low (in which case maximum revenue is not realized). Third-party aggregators collect a broad data set from multiple sources and package the data into data-feeds. Such third-party data lacks transparency in terms of the origin of the data and definitions of traits or features of the users who generated the data, which makes accessing and pricing a relevant segment or subset of that data implausible. In short, a technical solution for the problem of setting a price for an arbitrary segment of data does not currently exist in the data marketplace.

DETAILED DESCRIPTION

Figure 1A:
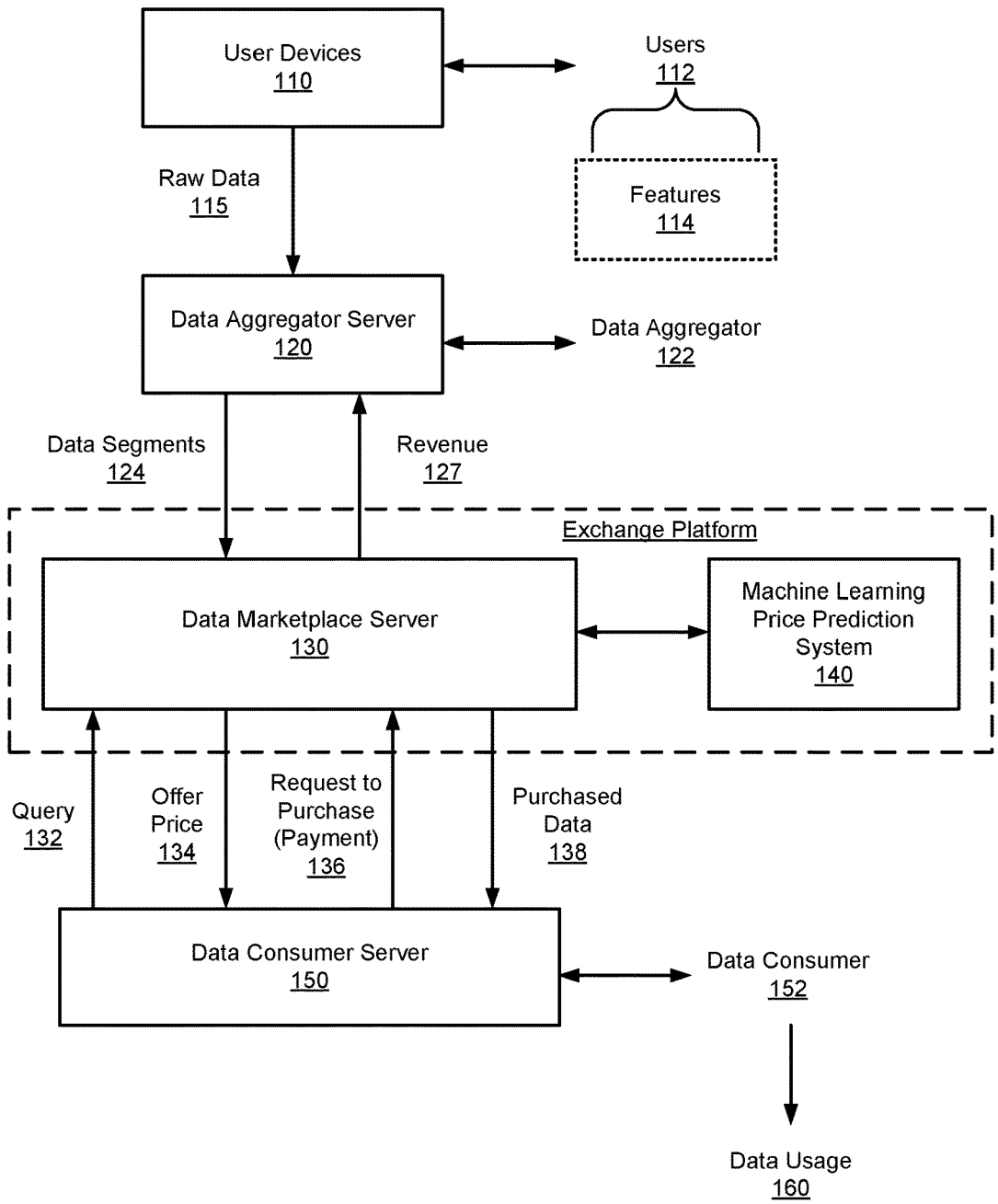
FIG. 1A illustrates a system for exchanging data segments between aggregators and consumers, in accordance with an embodiment of the present disclosure.

Techniques are disclosed for exchanging data segments between data aggregators (data sellers) and data consumers (data buyers). In an embodiment, these techniques can be used to calculate a value of an arbitrary data segment from a data aggregator using machine learning, and to calculate an offer price for the data segment based on the calculated value. The arbitrary data segment can be, for instance, a subset of larger bulk data, and includes data generated by one or more users, each of the users associated with one or more features that are represented in the data of the data segment. The features can be, for example, user traits such as age, gender, and preferred vehicle make and model, to name a few examples. The arbitrary data segment can be selected or identified, for example, in response to a query of a data consumer. For example, the data consumer's query can specify one or more desired user features that are represented in the seller's bulk data. So, the query can be applied to the bulk data to identify the arbitrary segment of that bulk data that includes users having those features. The data segment can then be readily offered to that interested data consumer at a calculated price that both (1) maximizes revenue to the data aggregator and (2) is likely to be accepted by the data consumer. Once a request is received from the consumer to purchase the data at the offer price, the disclosed techniques can be used to facilitate exchange of the data segment between the aggregator and consumer. Thus, a data marketplace or platform for the exchange of data segments is enabled. Such techniques solve the problems associated with online auctions and prediction markets because large numbers of consumers are not required, and the previously noted lack of transparency is somewhat mitigated because attributes of the data segment are used to calculate the price of that data segment. In more detail, and according to an embodiment, an individual user value is calculated for each user represented in the data segment, wherein the individual user value is a weighted sum of the one or more attributes of the data segment attributable to that user, plus an additive gaussian noise. In another example case, the individual user value is computed with one or more neural networks as a non-linear function of the one or more attributes of the data segment attributable to that user, plus an additive gaussian noise. In any such cases, the value of the data segment is the sum of the individual user values. Numerous other embodiments and variations will be apparent in light of this disclosure.

General Overview

Exchanging data between a data aggregator and a data consumer in a digital marketplace involves processes for receiving the data from a data aggregator, pricing the data, selling the data to a data consumer, and then sending the data to the consumer. As previously explained, setting a price for an arbitrary segment of data presents a challenging technical problem that remains unresolved by current technologies. This failure to resolve stems largely from the nature of the data, as well as how the data is aggregated and presented for sale. In particular, raw data is a non-standard commodity that is easily replicated. This data nevertheless has potential value to a consumer especially when the data is aggregated in a way that aligns with the consumer's needs. For instance, bulk data may include information that is not of interest to the consumer, reducing its overall appeal or usefulness and thus its value. However, if the bulk data is aggregated and/or segmented in a way that enhances the consumer's interest, then greater revenue can be realized by pricing the data segment at a level that will be supported by the market for that data segment. Existing pricing mechanisms, such as online auctions and prediction markets, do not work well when there are relatively small numbers of consumers or if the goods being traded are easily replicated, as is often the case with data (indeed, there may be only one buyer for a given arbitrary data segment). Seller posted pricing (e.g., a take-it-or-leave-it offer) can work for the sale of data, but the problem remains that the seller needs to set the price for each possible data set or segment thereof at a level that will maximize revenue, which is generally challenging at best and in some cases simply not feasible (it is simply not practical for a data seller to individually price each data segment requested by a potential buyer). Because of such limitations in the ability to set prices for arbitrary data segments, feature-specific datasets determined by specific user selection criteria may not be offered for sale and thus it is generally not possible for a consumer to purchase any particular segment of that data.

To this end, and according to an embodiment of the present disclosure, techniques are disclosed for exchanging data segments between data aggregators and data consumers. In one embodiment, these techniques can be used to receive an arbitrary data segment from an aggregator, to calculate a value of the data segment, and to calculate an offer price for the data segment based on the calculated value. As will be further explained in turn, the value of the data segment is set based on attributes or features of that data segment. In this manner, the data segment can be offered to a consumer at a price that maximizes revenue to the aggregator and is likely to be accepted by the consumer. Note that terms such as "maximize" and "maximizes" as used herein generally refer to maximizing a value within a given function, and not necessarily to maximizing that value in the absolute sense, as will be appreciated.

In any case, once a request is received from the consumer to purchase the data at the offer price, the disclosed techniques can be used to send, transmit, or otherwise exchange the data segment between the aggregator and consumer, according to some such embodiments. These techniques may be implemented, for example, in the context of an online data marketplace, and utilize a value estimation model which evolves to improve over time, based on statistical analysis of observations of transactions (e.g., offers and purchases) between aggregators and consumers. In some embodiments, the value estimation model is based on a machine learning technique referred to as a Causal Non-linear Bandit Model. As will be further explained in turn, causal bandit models describe problems in which a change in one variable affects another variable. Here, purchase decisions (a first variable) are modeled as a function of the value and the price of a data segment (two other variables).

In more detail, and according to one such embodiment, the arbitrary data segment of interest includes a collection of data generated by one or more individual users, each user possessing desired features and having a value. In one such example embodiment, the value of each user is based on a linear function of features possessed by the user, such as age, income, gender, or any other suitable characteristic. So, for instance, in some embodiments the estimation of the current value of the data segment is based at least in part on a weighted sum of the values of the individual users that constitute the data segment, plus an additive gaussian noise (e.g., such as noise that represents latent and unobservable features of the buyer). The system further calculates a statistical expected value of revenue from sale of the data segment as a function of price and the estimated current value of the data segment. The statistical expected value of revenue from the sale is then maximized (in the context of the function) to generate an offer price for the data segment.

System Architecture

FIG. 1A illustrates a system 100 for exchanging data segments between aggregators and consumers, in accordance with an embodiment of the present disclosure. In this system 100, users 112 are individuals who generate raw data 115 via one or more user devices 110 and from whom the raw data 115 are collected by a data aggregator server 120. The raw data 115 can include, for example, the opinions or preferences of the users 112 about various subjects or items, and/or various metrics that describe how the users 112 interact with those subjects or items. The raw data 115 can be generated, for example, through users' 112 participation in surveys, purchases, online searches, or through any other suitable techniques via interactions with the user devices 110. The raw data 115 can further represent traits, or features 114, of the users 112. These features 114 can be used to group or otherwise categorize the users 112 using non-personally identifiable information. Such features 114 may include, for example, one or more of gender, age, level of education, marital status, city, state, or country of residence, profession, web browsing history, purchasing history, interest in sports or other selected subjects, or any other term that describes the user 112 that is potentially considered interesting or useful for assigning a value to the raw data 115 generated by those users 112. For example, the users 112 can be associated with features 114 such as "men between the ages of 20 and 25 who frequently travel" or "single people who live in certain New York City ZIP codes and earn over $100,000 per year." Each user 112 can be associated with any number of features 114. The features 114 may be of interest to marketers of a product, in some example use cases. Thus, the users 112 generate the raw data 115. The raw data 115 is collected by a data aggregator 122 via a data aggregator server 120. The data aggregator server 120 aggregates and/or segments the raw data 115 into one or more data segments 124 on behalf of the data aggregator 122.

Note that the data aggregator 122 may be an entity that receives and aggregates data directly from users of its own resources, such as an automaker that collects data from users of its online surveys and vehicle customization tool, or an online search company that collects data from users of its search engine. Alternatively, the data aggregator 122 may be a third-party aggregator that receives and aggregates data from multiple sources, such as a company that has access to the data of multiple automobile dealerships (e.g., vehicle transaction data, including year, make, model, trim package, and price).

As can further be seen in FIG. 1A, the system 100 further includes an exchange platform that facilitates the exchange between the data aggregators 122 and the data consumers 152. The platform generally includes data marketplace server 130 and machine learning price prediction system 140. Note that the machine learning price prediction system 140 can be integrated into the data marketplace server 130, as will be appreciated. In more detail, the data segments 124 can be priced by the price prediction system 140 and offered for sale by the data marketplace server 130 on behalf of the data aggregator 122. As previously explained, data segments 124 include the raw data 115 generated by one or more of the users 112 who possess specific traits or features that are potentially of interest to the data consumer 152, who interacts with the data marketplace server 130 via a data consumer server 150. Note the data segments can be priced in advance of any user query and stored for later recall should an on-point user query be received (offline pricing), or in response to a user query (real-time pricing).

In one such embodiment, the data segments 124 are listed for sale on the data marketplace server 130, and the data consumers 152 can query 132 the data marketplace server 130 via the data consumer server 150 to request an offer price 134 for at least some of the data segments 124 attributable to users 112 that possess desired features. The offer price 134 is determined by a machine learning price prediction system 140, which as described in further detail below can be configured to set the offer price 134 so as to maximize revenue 127 to the data aggregator 122 or otherwise establish a price at which a given data segment 124 of interest can be offered for sale to the data consumer 152. The offer price 134 can be posted to the data consumer server 150 in response to the query 132. The data consumer 152 can then respond to the posted offer price 134 via the data consumer server 150 by requesting 136 to purchase the data segment 124 at the offer price 134 (e.g., with a payment), if the data consumer 152 is inclined to accept the offer price 134. The purchased data segment 138 is then sent to or otherwise exchanged with the data consumer 152 via the data consumer server 150, and the data consumer 152 can then use that purchased data segment for a desired purpose 160, such as, for example, targeted advertising. In some embodiments, the consumer's use of the data 138 may be limited based on prearranged agreements that govern the transaction.

The machine learning price prediction system 140 is configured to calculate the offer price 134 for data 138 representing a given data segment 124 that maximizes revenue 127 to the data aggregator 122, and also has a more likely probability of being accepted by an interested consumer 152 (relative to a transaction where the seller arbitrarily sets the price). To calculate the offer price 134, the price prediction system 140 uses a value estimation model, which is a machine learning technique referred to as a Causal Non-linear Bandit model. The model is based on statistical analysis of historical observations of data segment transactions in the marketplace 130. The statistical analysis incorporates the value of different users comprising the data segment as a linear function of their features, as will be explained in greater detail below. The value estimation model assumes that value is associated with the features of each user 112 (e.g., age, education, gender, etc.) and that the total value of each data segment 124 is additive over the users in that segment.

So, for example, and in accordance with one such embodiment, the value of a user 112 is based on a linear function of the desired features possessed by the user 112, and the estimation of the current value of the data segment is based on a weighted sum of the values of the individual users 112 that generated the data in the data segment 124, plus an additive gaussian noise (e.g., gaussian noise which corresponds to latent buyer features). This enables the data consumer 152 to purchase a desired arbitrary data segment 124 which can be, for example, a subset of one user's data or a combination of different segments of data coming from different users and possibly different sources (such as bulk data that includes data from a first car company and a second car company). The offer price 134 is calculated by performing a maximization operation (within the context of the linear function) on the statistical expected value of the revenue 127 to the data aggregator 122 from the sale of the arbitrary data segment 124, with the underlying assumptions that the data aggregator 122 will maximize the revenue 127 from the sale and that the data consumer 152 will make the purchase if the data consumer's valuation of the arbitrary data segment 124 meets or exceeds the offer price 134. Again, note that maximize in this context is not intended to imply an absolute maximization of revenue, but merely a maximized revenue within the linear valuation function. To this end, further note that the consumer 152 valuation of the arbitrary data segment 124 can exceed the offer price 134, in some use case scenarios, as will be appreciated.

For instance, in an example use case, the data aggregator 122 might aggregate the data segments 124 to include portions of the raw data 115 generated by one to two thousand users having the following features: they drive an automobile of manufacturer X and have a response rate to display advertisements that exceeds one percent. The manufacturer Y of a competitor automobile may wish to target these users with advertisements aimed at inducing them to switch brands. The manufacturer Y queries the marketplace for these data segments 124 as a data consumer 152 and receives a price offer 134, which is evaluated against Y's internal criteria of value. If the offer price 134 is less than Y's perceived value of the data segment 124, a purchase of data 138 will be made at the offer price 134, otherwise the offer will be passed over. The machine learning pricing prediction system 140 observes the transaction and updates the statistical value estimation model based on Y's request to purchase the data segment 138, the features of users 112 who generated the purchased data 138, and/or the offer price 134, as will be explained in greater detail below.

In more detail, according to an embodiment, a methodology implementing the techniques for determining a revenue maximizing price for a data segment based on statistical analysis of historical transactions includes calculating a value of a data segment based at least in part on the feature(s) of the users who generated the underlying data. The value is, in some such embodiments, calculated as a linear combination of one or more of these user features, plus an additive noise which serves to model unobservable buyer characteristics. The linear combination employs parameters based on weights of a value estimation model that is associated with a multivariate normal distribution. The multivariate normal distribution is initialized with an arbitrary value and is updated over time, based on observed transactions, to improve the value estimation model. The method also includes calculating a statistical expected value of revenue, from sale of the data segment, as a function of price and the value of the data segment. The method further includes generating an offer price for the data segment that maximizes the statistical expected value of revenue from the sale. The method further includes updating the weights of the value estimation model based on a request from the consumer to purchase the data segment at the offer price. The updating includes updating the multivariate normal distribution using a Laplace approximation, according to some such embodiments. The updated value estimation model may then be used to provide an improved estimate of the value of a new data segment from a subsequent consumer query.

Thus, the foregoing framework provides a system and methodology for predicting a revenue maximizing offer price for a data segment in a data marketplace based on statistical analysis of observations of historical trade transactions. Numerous example configurations and variations will be apparent in light of this disclosure. For instance, in another example embodiment, the machine learning price prediction system 140 and/or the data aggregator server 120 are both integrated into the data marketplace server 130. In addition, note that the servers 120, 130, and 150 can be implemented with any suitable computing devices, whether traditional server computer technology, or simply standard computing systems (e.g., desktop and laptop computers, smartphones, tablets, etc.) that can communicate with each other via established communication networks or links (including wired and/or wireless networks/links). Numerous architectures and configurations will be appreciated.

Figure 1B:
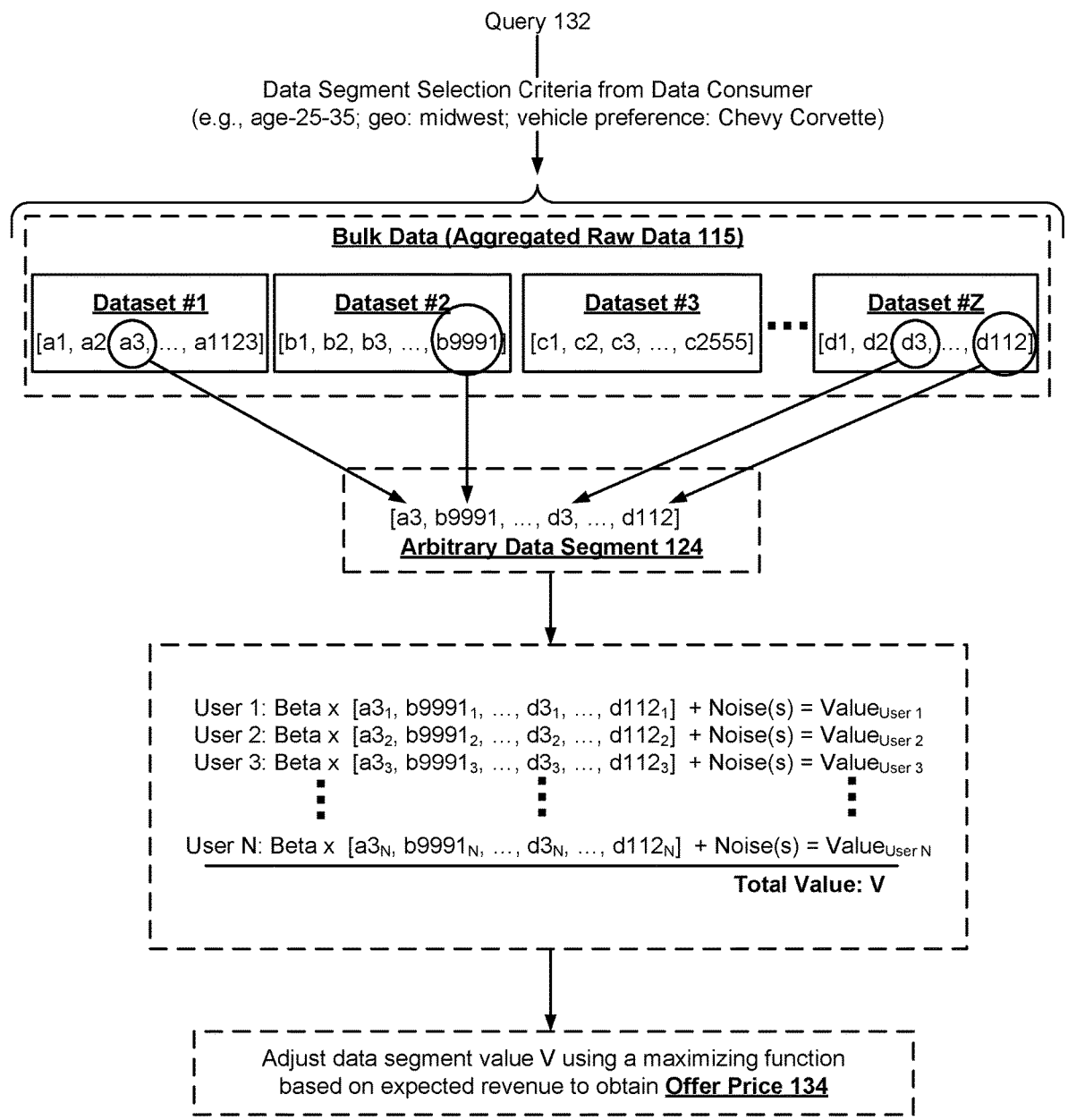
FIG. 1B illustrates an example use case of how the data exchange system of FIG. 1A allows a data consumer to submit a query for an arbitrary data segment and receive a corresponding offer price for that data segment, in accordance with an embodiment of the present disclosure.

FIG. 1B illustrates an example use case of how the data exchange system 100 of FIG. 1A allows a data consumer to submit a query for an arbitrary data segment and receive a corresponding offer price for that data segment, in accordance with an embodiment of the present disclosure. Further details of how the system 100 operates are provided with respect to FIGS. 2-8, according to example embodiments.

As can be seen in FIG. 1B, a query 132 is received from a data consumer. The query includes a number of desired traits or features that can be used to select a set of users meeting those criteria. In this particular example case, the selection criteria include an age range, a geographical location of the users, and a vehicle preference including make and model. The query can be generated, for instance, using a user interface that allows the data consumer to select user traits of interest (e.g., such as an input screen that includes a plurality of traits selectable by virtue of check boxes or pulldown menus). The query is presented to one or more databases or storage facilities of bulk data that collectively contain aggregated raw data 115. As will be appreciated, the bulk data is referred to as raw data but may be in any number of formats. In some such cases, the data is vectorized to facilitate processing of that data (e.g., summing, in this particular case). In other embodiments, the data can be vectorized or otherwise formatted after the data segment selection process. Further note the bulk data may be aggregated from one or more sources, as previously explained. In the case of multiple sources, a first source can be, for example, a first car company, the second source can be a second car company, etc. Alternatively, the first source may be a first business unit within a given company, and the second source may be a second business unit within a company, etc. In a more general sense, the aggregated data can come from any number of sources.

In some embodiments, the bulk data may be expressed as a matrix, with rows for users and columns for features, wherein a matrix entry of '1' indicates that the user possesses the feature or trait, while an entry of '0' indicates that the user does not possess the feature. This type of matrix is sometimes referred to as a user-trait membership matrix. In cases where available bulk data includes relatively large numbers of users and features, the user-trait membership matrix may be large but sparse. For example, the matrix may have hundreds of thousands of rows and columns (or more) but only a relatively few feature values may be available for any given user, so that many or most elements of the matrix are zero valued. To improve computational efficiency in such cases, the user-trait membership matrix may optionally be factorized using singular value decomposition (SVD) to generate a transformation matrix which linearly transforms the user representation in the original user-trait membership space (i.e., a row of the user-trait membership matrix) into a representation with de-correlated features which can be selected to have many fewer features, at the expense of possibly greater error in approximating the user-trait membership matrix. The resulting reduced-size user-trait membership matrix offers a more efficient representation of the bulk data and requires fewer computations in the machine learning price prediction system 140, as described below.

In any case, the query 132 is used to identify an arbitrary data segment 124 of interest, which includes a specific subset of the bulk data. The data segment 124 is presented to the data marketplace server 130 of the exchange platform, which in conjunction with the machine learning price prediction system 140 calculates a value of the requested data segment 124 as well as an offer price 134 that can be offered to the data consumer in response to query 132. As previously explained and further demonstrated with reference to example embodiments of FIGS. 2-8, the exchange platform estimates the value of different individuals represented in the requested data segment 124 as a function of different predefined features (the selection criteria specified in the query 132). As can be seen in this example case, the machine learning price prediction system 140 assumes that value is additive over all users identified by the query 132, which further enables buyers (data consumer) to not only select their desired data segment, which could be a subset of one seller's data or a combination of different segments of data coming from different sellers (or sources), but also enables pricing of such data segments to be readily calculated. Thus, in one such embodiment, the value V of the requested data segment 124 is calculated based at least in part on the one or more features (for each user) represented in the data of the data segment and an additive gaussian noise. As will be further explained in turn, the value calculation may include a vector of weight factors β (beta) and noise with standard deviation s, which in turn are based on a weight matrix W associated with the value estimation model, to improve accuracy of the estimate. In more detail, and according to an embodiment, a user value is calculated for each user represented in the data segment, wherein an individual user value is a weighted sum of the attributes of the data segment attributable to that user, plus an additive gaussian noise that represents latent and unobservable features of the data consumer 152, and the overall value V of the data segment is the sum of the individual user values. The resulting value V of the requested data segment 124, which as explained effectively reflects a weighted summation of all user traits responsive to that query 132, can then be further refined or adjusted to generate an offer price 134, by applying a maximization function based on the revenue expected by the seller (data aggregator).

As will be appreciated, the noise is intended to model the notion that buyers, as people, don't always act rationally or as otherwise might be expected, so there is a little bit (or sometimes a lot) of noise added as a kind of jitter to reflect the fact that sometimes a given buyer's idea of a good price can vary for unknown reasons. Whether the noise is a little or a lot is reflected by the standard deviation parameter s which gets updated along with beta β. The data segment value calculation, weighting, addition of noise, maximizing function, will now be discussed in more detail with reference to FIGS. 2-8.

Machine Learning Based Price Prediction

Figure 2:
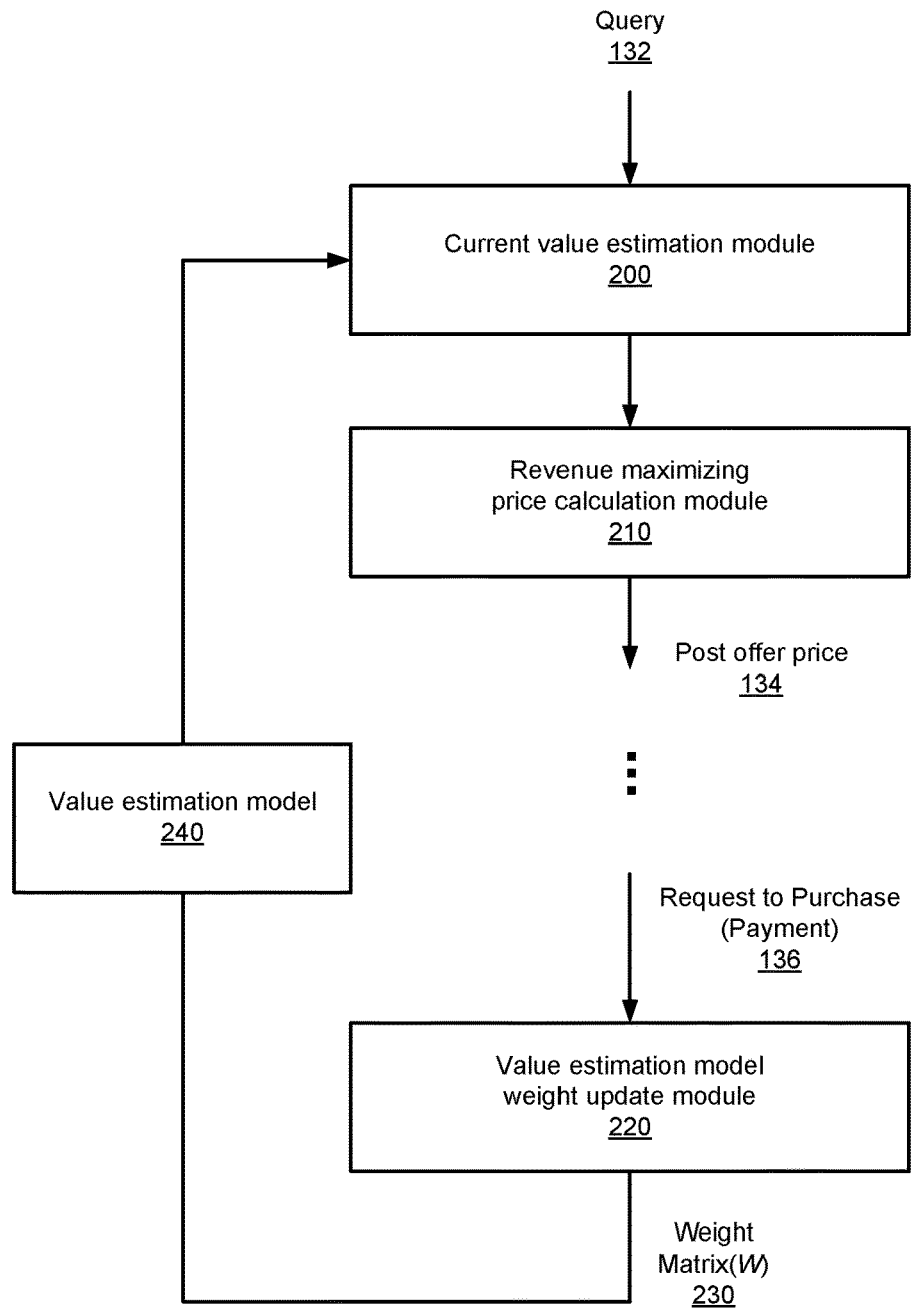
FIG. 2 is a block diagram of a machine learning system that can be used to predict the price of a data segment in the data exchange system of FIG. 1A, in accordance with an embodiment of the present disclosure.

FIG. 2 is a block diagram of a machine learning price prediction system 140, configured in accordance with an embodiment of the present disclosure. The price prediction system 140 employs a machine learning technique referred to as a Causal Non-linear Bandit model, and includes a current value estimation module 200, a revenue maximizing price calculation module 210, a value estimation model 240, and a value estimation model weight update module 220. In operation, for each query 132 for a data segment 124, the current value estimation module 200 is configured to calculate an estimate of the current value of an arbitrary data segment of interest, to the consumer, as a linear combination of features of the data segment plus additive noise. The linear combination employs parameters (e.g., coefficients of the linear function) which are based on weights obtained from the value estimation model 240. The revenue maximizing price calculation module 210 is configured to calculate a statistical expected value of revenue, from a sale of the data segment, as a function of price and the estimated current value of the data segment 124. The revenue maximizing price calculation module 210 is also configured to generate an offer price for the data segment 124 as the price that maximizes the statistical expected value of revenue from the sale. The offer price is posted 134 to the data consumer 152 via the data consumer server 150, and a request to purchase the data segment 124 (or a portion thereof) at the offer price 136 (which can include a payment or other suitable financial transaction) is received by the data marketplace server 130. The weight update module 220 is configured to update the probability distribution of the value estimation model 240 based on the request to purchase the data segment at the offer price 136. The updated model weight matrix W 230 is then used for processing of the next consumer query.

Note that a module, according to some embodiments, can be implemented as software or instructions encoded on one or more physical machine-readable mediums that when executed by one or more processors cause a process to be carried out that manifest the functionality of that module. Alternatively, a module can be a combination of software and a processor configured to operate together as a functional unit (e.g., such as microcontroller with embedded code, or a programmed microprocessor), or hardware circuitry (e.g., such as custom-built semiconductor or a field programmable gate array).

Figure 3:
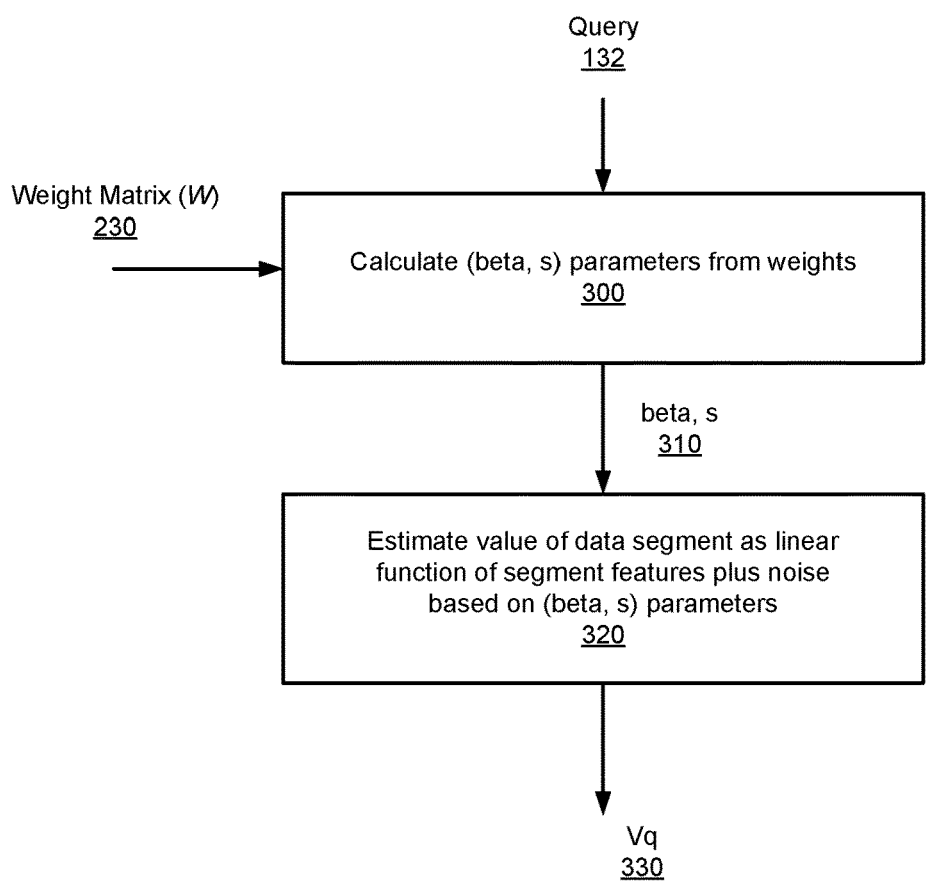
FIG. 3 is a block diagram of a current value estimation module of the system of FIG. 2, configured in accordance with an embodiment of the present disclosure.

FIG. 3 is a block diagram of a current value estimation module 200, configured in accordance with an embodiment of the present disclosure. The machine learning price prediction system 140 receives a query 132 from a potential data consumer 152 for a data segment 124 via the data consumer server 150. The data segment 124 is, as described above, a collection of raw data 115 generated by one or more users 112 possessing specific traits or features that are of interest to the data consumer 152. For example, if there are three user features {Age, Gender, Education}, then, for each user i, a three-dimensional feature vector $x_i$ may be defined as $$x_i = \{x_{i,age}, x_{i,gen}, x_{i,edu}\}$$

where each of the features are quantified in a suitable manner. For example, age can be a numerical value for the age (e.g., age 25=00100101; age 54=01010100), gender can be a binary value representing male or female (e.g., logical 0=male; logical 1=female), and education can be a numerical value representing highest grade completion (e.g., high school: 01100; bachelor's degree: 10000; Master's degree: 10010; Ph.D. degree: 10100). The value of the data segment 124, $X_q$, for a given query 132, q, is assumed to be additive over users and a linear function of the user features. Note that a trait or feature like gender can be left out of the valuation, and instead only used to select male or female data if so desired, in some example use cases. Thus, $X_q$ can be expressed as:

$$X_q = \Sigma_{x \in q} x$$

or, for the three-dimensional example above:

$$X_q = \{\Sigma_{x_i \in q} x_{i,age}, \Sigma_{x_i \in q} x_{i,gen}, \Sigma_{x_i \in q} x_{i,edu}\}$$

The current value estimation module 200 is configured to calculate an estimate of a current value of the data segment 124. The value of the data segment 124 to the consumer 152 is modelled as a linear function of the segment features plus additive noise. The additive noise serves to represent unobservable characteristics of the data consumer 152. In some embodiments, the estimated value of the query q can be expressed as:

$$V_q = \Sigma_{x \in q} (\beta x + \epsilon), \text{ where } \epsilon \sim \mathcal{N}(0, s)$$

where β is a vector of the parameters (e.g., weighting factors or coefficients) that are applied to the features x, and ε is the additive Gaussian white noise (e.g., a normal probability distribution) with mean zero and standard deviation s. This can be rewritten as:

$$V_q = \beta \Sigma_{x \in q} x + \Sigma_{x \in q} \epsilon$$

or $$V_q = \beta X_q + \epsilon_q, \text{ where } \epsilon_q \sim \mathcal{N}(0, s\sqrt{N}),$$

where $N = \Sigma_{x \in q} 1$ (the number of features)

The parameters β and s 310 are obtained, at operation 300, from the weight matrix W 230 of the value estimation model 240, which can be expressed as:

$$W = \left[\frac{\beta}{s}, \frac{-1}{s}\right]$$

and which has a multivariate normal probability distribution represented by a mean vector µ and a standard deviation matrix Σ:

$$W \sim \mathcal{N}(\mu, \Sigma)$$

In some embodiments, the distribution of W may be initialized to zero mean and unity standard deviation (e.g., µ is a vector of zeros and Σ is an identity matrix). The probability distribution of W is updated after each observed consumer purchase decision, as will be described in greater detail below. The parameters β and s are calculated by sampling W using the current µ and Σ.

Thus, with knowledge of β and s, the estimated value $V_q$ 330 can be calculated, at operation 320 for a given query q.

Figure 4:
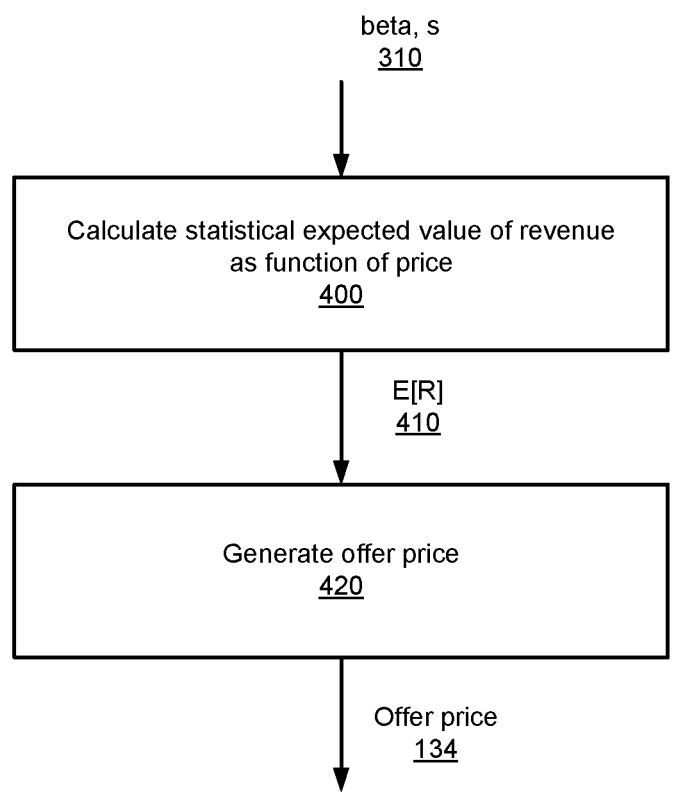
FIG. 4 is a block diagram of a revenue maximizing price calculation module of the system of FIG. 2, configured in accordance with an embodiment of the present disclosure.

FIG. 4 is a block diagram of a revenue maximizing price calculation module 210, configured in accordance with an embodiment of the present disclosure. The revenue maximizing price calculation module 210 is configured to calculate a statistical expected value of revenue, from sale of the data segment, as a function of price and the estimated current value of the data segment. The revenue R, for a given price p, is defined as:

$$R = p * I(p < V_q)$$

where I is an indicator function that equals 1 if the argument of I is true. In other words, the revenue at a given price equals that price if the price is less than the value to the data consumer 152, in which case the data consumer 152 is assumed to purchase the data segment. The statistical expected value of the revenue, E[R] 410, can therefore be calculated, at operation 400, as:

$$E[R] = p * \text{Probablity}(p < \beta X_q + \epsilon_q)$$

or $$E[R] = p * \left(1 - \text{Probability}\left(\frac{\epsilon_q}{s\sqrt{N}} \leq \frac{p - \beta X_q}{s\sqrt{N}}\right)\right) = p * \Phi\left(\frac{\beta X_q - p}{s\sqrt{N}}\right)$$

where Φ is the standard normal cumulative distribution function, which can be calculated using any suitable techniques in light of the present disclosure.

The revenue maximizing price calculation module 210 is also configured to generate an offer price 134 for the data segment 124 as the price that maximizes the statistical expected value of revenue from the sale. This can be calculated, at operation 420, as:

$$p_{offer} = \operatorname{argmax}_p E[R] = \operatorname{argmax}_p p * \Phi\left(\frac{\beta X_q - p}{s\sqrt{N}}\right)$$

The offer price 134 is then presented to the data consumer 152 via the data consumer server 150, and the data consumer 152 makes a purchase decision based at least in part on the offer price 134 and on other valuation factors, such as the utility, relevance, and usefulness of the data to the data consumer's needs.

Figure 5:
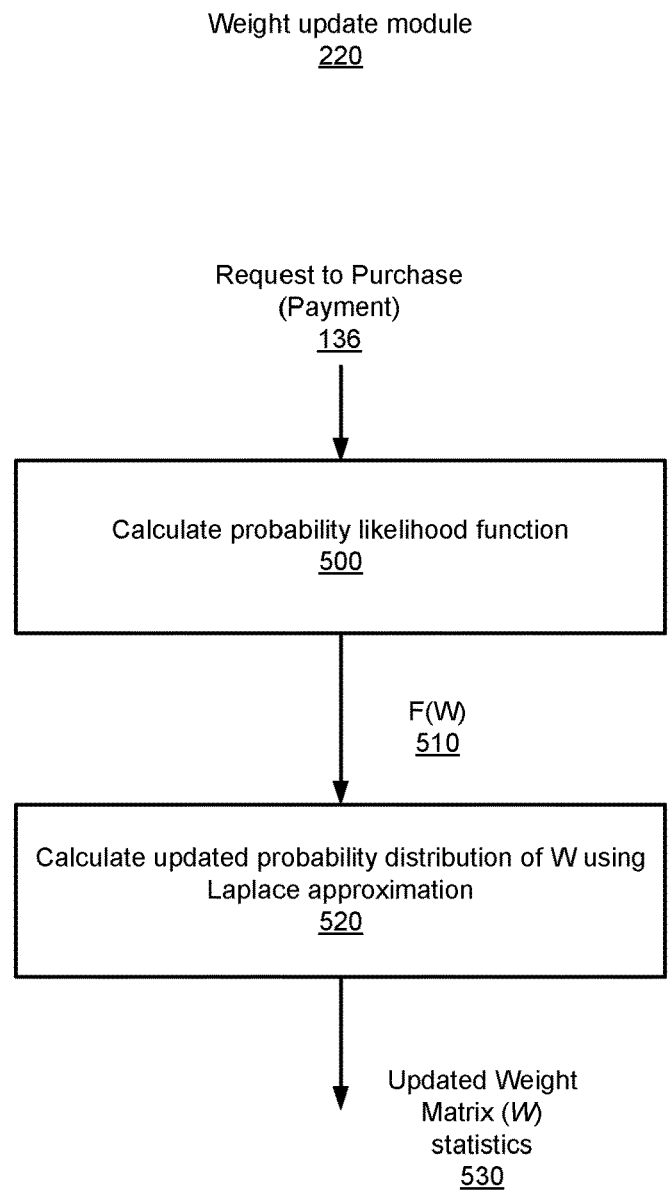
FIG. 5 is a block diagram of a weight update module of the system of FIG. 2, configured in accordance with an embodiment of the present disclosure.

FIG. 5 is a block diagram of a weight update module 220, configured in accordance with an embodiment of the present disclosure. The weight update module 220 is configured to update the probability distribution (µ,Σ) of the value estimation model 240 based on the request to purchase the data segment 136 at the offer price 134. The purchase request 136 (representing a decision by the consumer to purchase the data segment) is a binary value designated as Y, which is set to one for acceptance of the offer price or to zero if the offer price is declined or otherwise not agreed to by the consumer. In some embodiments, the update is calculated according to the following procedure. The variable X is defined as:

$$X = \left[\frac{X_q}{\sqrt{N}}, \frac{p_{offer}}{\sqrt{N}}\right]$$

The dot product of X and the current value of W is computed as:

$$W \cdot X = \frac{\beta X_q - p_{offer}}{s\sqrt{N}}$$

At operation 500, a probability likelihood function $f(W)$ 510 of the current value of W is calculated, as:

$$f(W) = \Phi((2Y-1)W \cdot X)\text{Probability}(W)$$

At operation 520, an updated probability distribution of W is calculated using a Laplace approximation. The updated mean µ for W is defined as $W_0$ which is calculated as:

$$W_0 = \text{maxima}(\log(f(W)))$$

The update standard deviation X for W is calculated as the inverse of A, where A is calculated as:

$$A = -\nabla\nabla \log(f(W=W_0))$$

Thus, the updated probability distribution for W can be expressed as:

$$\mathcal{N}(W_0, A^{-1})$$

The updated value estimation model 240 (updated W statistics 530) may then be used to estimate the value of a new data segment 124 from a subsequent query 132. With each iteration of the price prediction procedures, applied to new consumer queries 132, the value estimation model 240 improves and the β and s parameters converge to values that more closely predict the true value to the data consumer 152. Said differently, the system may start with a random or arbitrarily selected value of W, but as the number of trades increases, the revenue captured by the aggregators approaches the revenue that would be achieved if an optimal value of W, were known from the start.

As will be appreciated, and according to an embodiment, this iterative update process on the value estimation model 240 implements a Causal Non-linear Bandit model machine learning technique which describes the problem in which a change in one variable affects another variable. Here, the purchase decision Y (a binary "reward" value) is the first variable, which is modeled as a function of the value V and the price p for a data segment X (two other variables). The process is non-linear in the calculation of the weight updates for the model due to the non-linear relation between the segment values and the buyer response (purchase or not purchase, via the indicator function I), and is accomplished through the weight matrix W 230. In particular, the non-linearity here comes from the fact that the purchase decision Y (a binary "reward" value) is modeled as a function of the value V and the price p for a data segment X. So, the process is non-linear in the calculation of the weight updates (weight matrix W 230) for the model due to the non-linear relation between the segment values and the buyer response (purchase or not purchase, via the indicator function I). So as to avoid confusion, note that this non-linearity is separate from calculating the value of the segment as a linear function of features which characterize the user. That linear function uses weight factors β (beta) which are derived from the weight matrix W 230. Thus, generally stated, the linear part has to do with how the weights are applied to the data, while the non-linear part has to do with how the weights are calculated from the data. As will be discussed in turn with respect to FIG. 8, another example embodiment employs a neural network to calculate the value of the segment as a non-linear function of features which characterize the user, also using weight factors β (beta) which are derived from the weight matrix W 230.

Methodology

Figure 6:
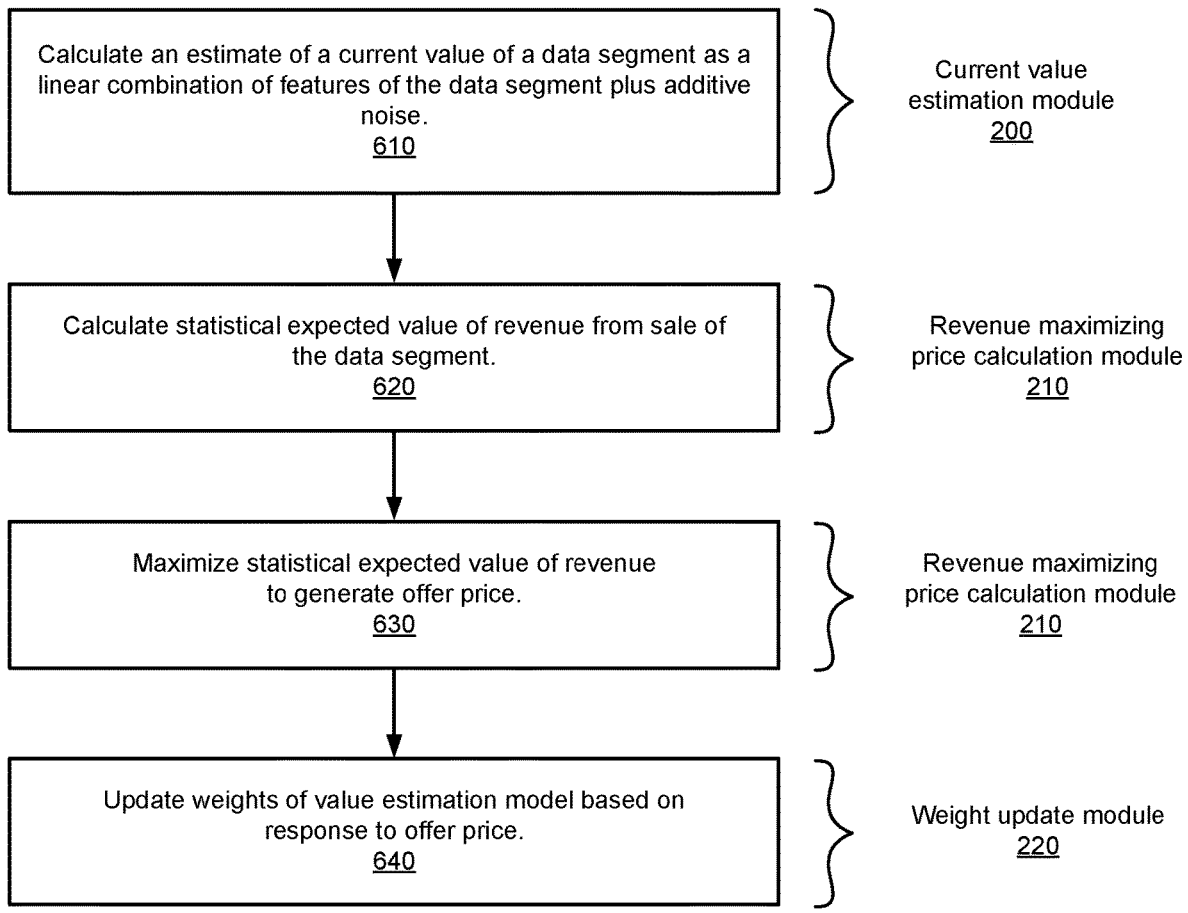
FIG. 6 is a flowchart illustrating a method by which a system exchanges data segments between aggregators and consumers using a machine learning price prediction model, in accordance with an embodiment of the present disclosure.

FIG. 6 is a flowchart illustrating a method 600 by which a system exchanges data segments between aggregators and consumers using a machine learning price prediction model, in accordance with an embodiment of the present disclosure. As can be seen, the method is described with reference to the configuration of machine learning price prediction system 140 of FIG. 2, and the components thereof from FIGS. 3-5. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration. For instance, while the methodology according to some such embodiments is carried out by three distinct modules (e.g., 200, 210, and 220), other embodiments may be carried out by a fewer number of modules, or a greater number of modules, depending on the degree of functional integration. For instance, in some embodiments, module 220 may be integrated into 200. Other such variations will be apparent.

The method includes, at operation 610, calculating a value of a data segment based at least in part on one or more features of each user who generated the underlying data of the data segment. As noted above, the data segment includes data generated by one or more users, and the features of the data segment represent traits or characteristics of the users. The value of the data segment is calculated as a linear combination of the features of the data segment plus additive noise. The linear combination employs parameters based on weights of a machine learning based value estimation model 240 (e.g. a Causal Non-linear Bandit Model). In some such embodiments, the calculation may be performed in response to a query from a consumer referencing the data segment, or in response to receiving the data segment from a data aggregator server. Recall, data segments can be valued offline or in real-time. The previous discussion with respect to module 200 is equally applicable here.

The method continues, at operation 620, by calculating a statistical expected value of revenue, from sale of the data segment, as a function of price and the estimated current value of the data segment, as previously described. The previous discussion with respect to module 210 is equally applicable here.

At operation 630, the statistical expected value of revenue from the sale is maximized to produce an offer price for the data segment. In some embodiments, the offer price is presented to the consumer. The previous discussion with respect to module 210 is equally applicable here.

At operation 640, the weights of the value estimation model 240 are updated based on a request to purchase the data segment at the offer price from the consumer. In some embodiments, the weights of the value estimation model 240 are associated with a multivariate normal distribution defined by a vector of mean values and a matrix of standard distributions, and the updating of the weights comprises updating the multivariate normal distribution using a Laplace approximation. The previous discussion with respect to module 220 is equally applicable here.

Alternative Embodiments Using Neural Networks

Figure 7:
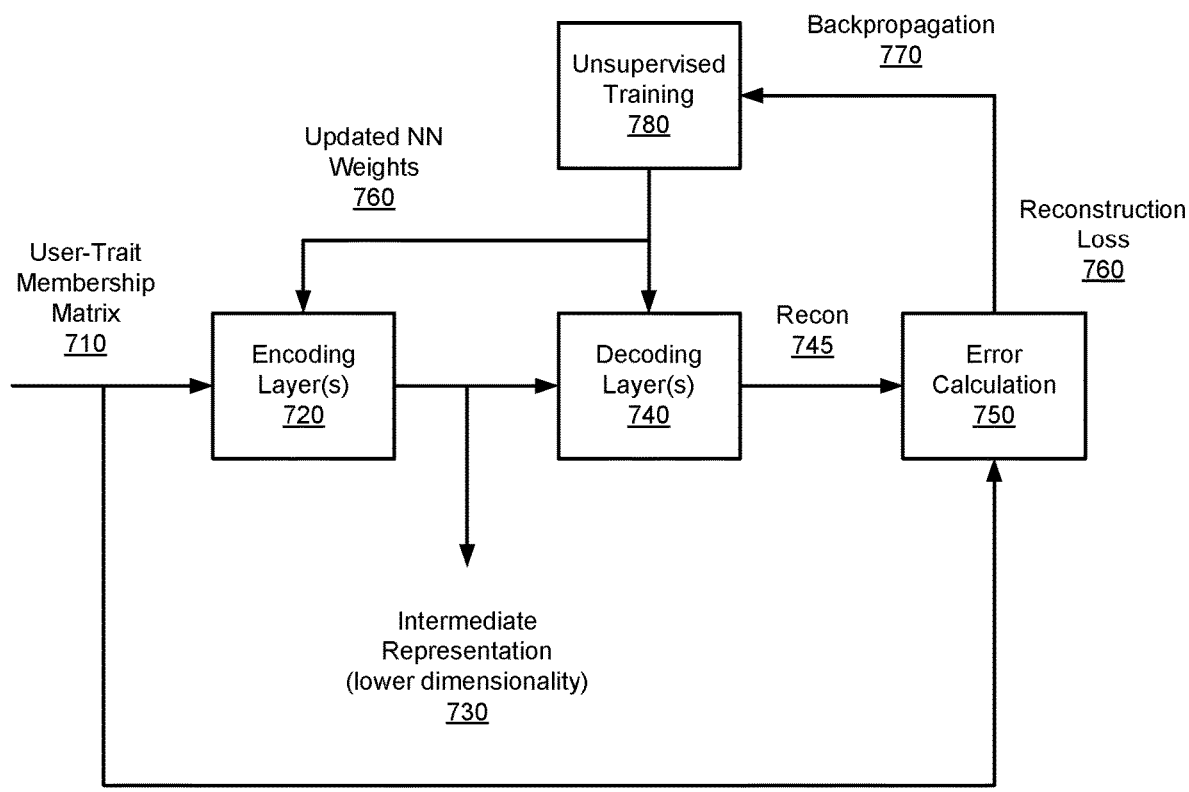
FIG. 7 is a block diagram of an autoencoder neural network that can be used to pre-process bulk user data for feature reduction, in accordance with an embodiment of the present disclosure.

FIG. 7 is a block diagram of an autoencoder neural network 700 that can be used to pre-process bulk user data for feature reduction, in accordance with an embodiment of the present disclosure. As previously noted, the bulk data may be expressed as a user-trait membership matrix, with rows for users and columns for features, wherein a matrix entry of '1' indicates that the user possesses the feature or trait, while an entry of '0' indicates that the user does not possess the feature. In cases where available bulk data includes relatively large numbers of users and features, the user-trait membership matrix may be large but sparse since most users will possess only a small fraction of all possible features. As previously described, an SVD technique can be used to reduce the size of the user-trait membership matrix and improve computational efficiency of the machine learning price prediction system 140. In still other example embodiments, however, an autoencoder neural network, as shown in FIG. 7, may be used as an alternative to the SVD technique.

In more detail, and according to one such embodiment, rather than limiting the user representation transformation to a linear transformation (as the SVD does), an autoencoder neural network 700 can be used to reduce the number of features via non-linear transformations of the original features. One advantage of autoencoders over SVD is that the user-trait membership matrix might be well approximated with fewer features.

As can be seen, the autoencoder 700 includes one or more encoding layers 720, one or more decoding layers 740, an error calculation module 750, and an unsupervised training module 780. The encoding layers 720 are trained to transform the input, in this case the user trait membership matrix 710, into an intermediate representation 730 of lower dimensionality. The decoding layers 740 are trained to generate a reconstruction 745 of the user trait membership matrix 710 from the intermediate representation 730. Error calculation module 750 is configured to calculate the error between the user trait membership matrix 710 and the reconstruction 745. This error is referred to as the reconstruction loss 760 and may be calculated as a mean squared error or any suitable error metric. The reconstruction loss 760 is provided through backpropagation 770 to training module 780 which performs unsupervised training of the network to update the network weights 760 (e.g., the weights of the nodes of the encoder and decoder layers). Unsupervised training has the advantage that the network learns on-the-fly and does not require labeled training data.

A choice between these two approaches (SVD versus autoencoder neural network) can be made, for example, empirically by comparing the respective approximation errors for a given user-trait membership matrix.

Figure 8:
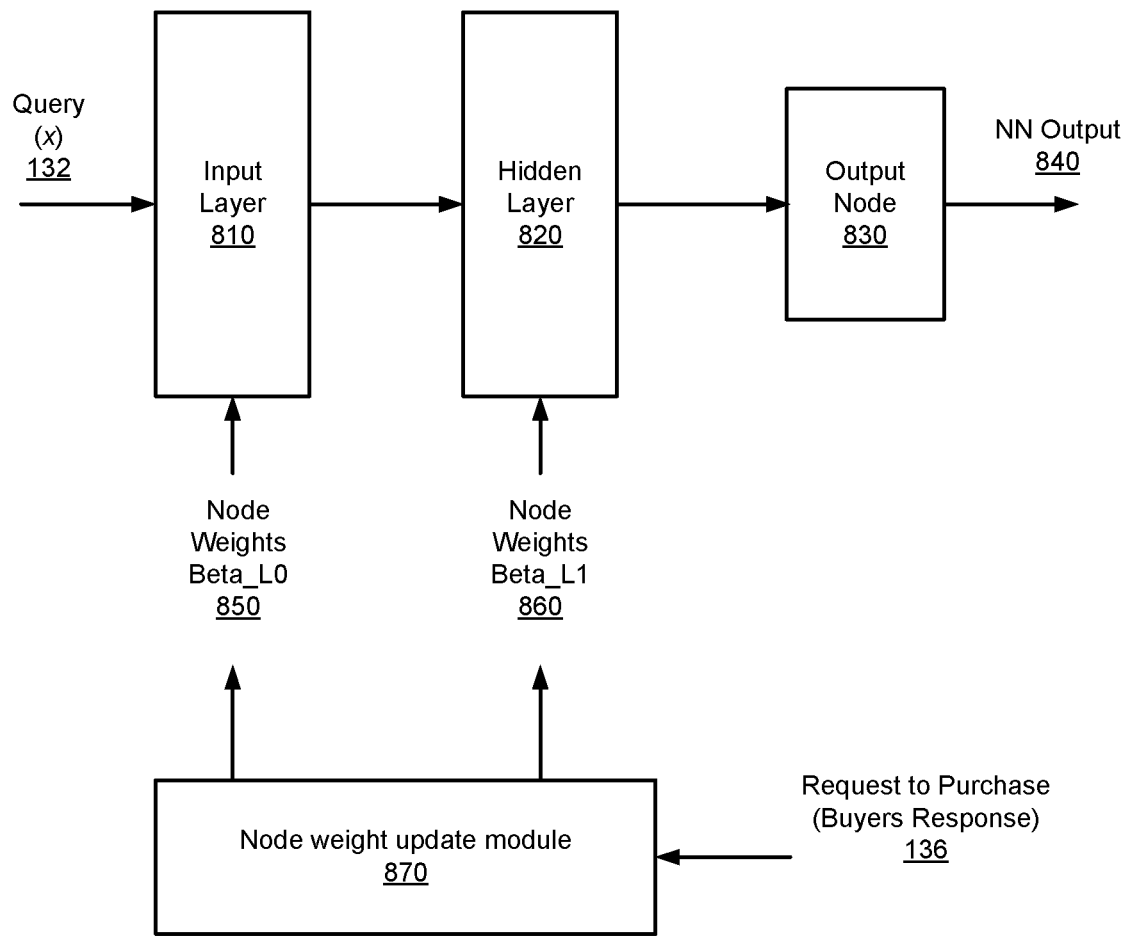
FIG. 8 is a block diagram of a neural network that can be used for current value estimation in the system of FIG. 2, configured in accordance with another embodiment of the present disclosure.

FIG. 8 is a block diagram of a neural network 800 that can be used for current value estimation in the system of FIG. 2, configured in accordance with another embodiment of the present disclosure. In this alternative embodiment, a neural network 800 may be employed for estimation of the value of a data segment. Note that, as described earlier, the value of a data segment to a buyer can be estimated as a linear combination or transformation of the user features (e.g., operation 320 of FIG. 3). This estimation process, however, may also be implemented using a neural network. In more detail, and according to one such embodiment, rather than assuming a linear relationship, the value may be estimated using the neural network 800, configured to transform the user features in a non-linear manner. The neural network 800 is shown to include an input layer 810, a hidden layer 820, and an output node 830. While the network 800 is shown, for simplicity, as a single layer network (one hidden layer 820), it will be appreciated that larger networks with greater numbers of layers may be used in accordance with the techniques described herein.

The neural network output 840 can be expressed as:

$$NN\ \text{output}(x;\beta)=f(x;[\beta_{L0}],[\beta_{L1}])=\beta_{L1}\cdot\sigma(\beta_{L0}\cdot x)$$

where $$\sigma(T) = \frac{1}{1+e^{-t}}$$

where the neural network performs the function $f$ on the inputs x (query 132) using weights $\beta$ (beta) for the input layer $\beta_{L0}$ 850 and the hidden layer $\beta_{L1}$ 860 to generate the output 840. Note that $\sigma(t)$ is the non-linear activation function of the network, in this case a sigmoid function, although other functions may be used. The value of the data segment can thus be non-linearly modelled as:

$$V_q = \sum_{x \in q}(NN\ \text{output}\ (x;\beta) + \epsilon)$$

where $\epsilon$ is the additive gaussian noise used to represent latent and unobservable features of the buyer, as previously explained.

Node weight update module 870 is configured to update the node weights $\beta_{L0}$ 850 and $\beta_{L1}$ 860 based on the buyer's response 136, in a manner comparable to the linear case described previously, through updates of the multivariate normal distribution using a Laplace approximation. In particular, and s are determined from updates to W, in which W=[$\beta$, s]. In this non-linear case, however, the probability likelihood function $f(W)$ of the current value of W is calculated, as:

$$f(W) = \Phi\left((2Y-1)\left(\frac{\sum_{x \in q}(f(x;[\beta_{L0}],[\beta_{L1}])-p)}{s\sqrt{N}}\right)\right)\text{Probability}\ (W)$$

The use of a neural network here offers an advantage in that the values can be approximated with relatively low error; however, this may increase the number of model parameters and the quantity of data required for learning the value function. Also, this may negatively affect the quality of the Laplace approximation used to update the probability distribution of W (which assumes a Gaussian distribution), as previously described. Such trades can be considered at implementation.

Example Platform

Figure 9:
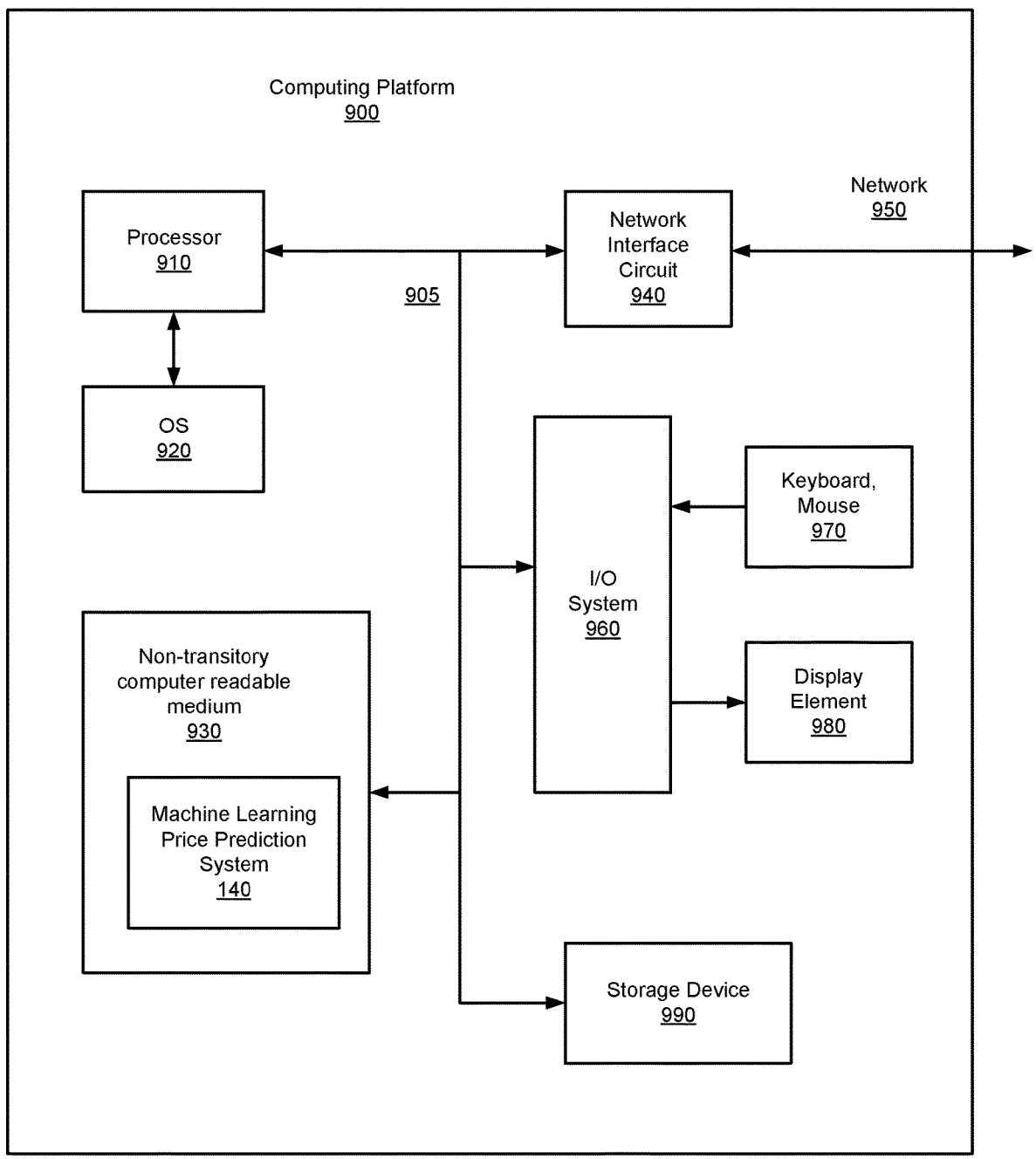
FIG. 9 is a block diagram schematically illustrating a computing platform configured to exchange data segments between aggregators and consumers, in accordance with an embodiment of the present disclosure.

FIG. 9 is a block diagram schematically illustrating a computing platform 900 configured to perform any of the techniques as variously described in this disclosure, configured in accordance with an embodiment of the present disclosure. For example, in some embodiments, the price prediction system 140 of FIG. 2, or any portions thereof as illustrated in FIGS. 3-5, and the methodologies of FIG. 6, or any portions thereof, are implemented in the computing platform 900. In some embodiments, the computing platform 900 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing device that has sufficient processor power and memory capacity to perform the operations described in this disclosure. In some embodiments, a distributed computational system is provided comprising a plurality of such computing devices.

The computing platform 900 includes one or more storage devices 990 and/or non-transitory computer-readable media 930 having encoded thereon one or more computer-executable instructions or software for implementing techniques as variously described in this disclosure. In some embodiments, the storage devices 990 include a computer system memory or random-access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 990 includes other types of memory as well, or combinations thereof. In one embodiment, the storage device 990 is provided on the computing platform 900. In another embodiment, the storage device 990 is provided separately or remotely from the computing platform 900. The non-transitory computer-readable media 930 include, but are not limited to, one or more types of hardware memory, non-transitory tangible media (for example, one or more magnetic storage disks, one or more optical disks, one or more USB flash drives), and the like. In some embodiments, the non-transitory computer-readable media 930 included in the computing platform 900 store computer-readable and computer-executable instructions or software for implementing various embodiments. In one embodiment, the computer-readable media 930 are provided on the computing platform 900. In another embodiment, the computer-readable media 930 are provided separately or remotely from the computing platform 900.

The computing platform 900 also includes at least one processor 910 for executing computer-readable and computer-executable instructions or software stored in the storage device 990 and/or non-transitory computer-readable media 930 and other programs for controlling system hardware. In some embodiments, virtualization is employed in the computing platform 900 so that infrastructure and resources in the computing platform 900 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 905 is also provided to allow for communication between the various components listed above and/or other components not shown. Computing platform 900 can be coupled to a network 950 (e.g., a local or wide area network such as the internet), through network interface circuit 940 to allow for communications with other computing devices, platforms, resources, clients, and Internet of Things (IoT) devices.

In some embodiments, a user interacts with the computing platform 900 through an input/output system 960 that interfaces with devices such as a keyboard and mouse 970 and/or a display element (screen/monitor) 980. The keyboard and mouse may be configured to provide a user interface to accept user input and guidance, and to otherwise control the price prediction system 140. The display element may be configured, for example, to display the results of transactions (e.g., offers and sales) using the disclosed techniques. In some embodiments, the computing platform 900 includes other I/O devices (not shown) for receiving input from a user, for example, a pointing device or a touchpad, etc., or any suitable user interface. In some embodiments, the computing platform 900 includes other suitable conventional I/O peripherals. The computing platform 900 can include and/or be operatively coupled to various suitable devices for performing one or more of the aspects as variously described in this disclosure.

In some embodiments, the computing platform 900 runs an operating system (OS) 920, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 900 and performing the operations described in this disclosure. In one embodiment, the operating system runs on one or more cloud machine instances.

As will be appreciated in light of this disclosure, the various modules and components of the system, as shown in FIGS. 1-8, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 900, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 is a computer program product including one or more non-transitory machine-readable mediums encoded with instructions that when executed by one or more processors cause a process to be carried out for pricing arbitrary data segments, the process comprising: receiving an arbitrary data segment, the data segment including data generated by a plurality of users and aggregated from one or more data sources, each of the users associated with one or more features that are represented in the data of the data segment; calculating an individual user value for each user represented in the data segment, wherein an individual user value is a weighted sum of the user features represented in the data segment attributable to that user, plus an additive gaussian noise; calculating a value of the data segment by summing the individual user values; and offering the data segment for purchase at an offer price based on the calculated value of the data segment.

Example 2 includes the subject matter of Example 1, the process further comprising: calculating the offer price for the data segment as a function of the calculated value of the data segment and a statistical expected value of revenue from a sale of the data segment.

Example 3 includes the subject matter of Examples 1 or 2, further comprising: updating the calculated value of the data segment based at least in part on the calculated offer price, wherein the updating includes weighting the one or more features represented in the data of the data segment with a multivariate normal distribution using a Laplace approximation.

Example 4 includes the subject matter of any of Examples 1-3, wherein the calculating of the offer price is further based on a price that maximizes the statistical expected value of revenue from the sale of the data segment.

Example 5 includes the subject matter of any of Examples 1-4, wherein the plurality of users includes a first user and a second user, and the one or more data sources includes a first data source and a second data source, and wherein the data segment includes a first portion of data from the first data source that includes data of the first user, and a second portion of data from the second data source that includes data of the second user, the first and second data sources being different companies.

Example 6 includes the subject matter of any of Examples 1-5, wherein the additive gaussian noise represents one or more unobserved characteristics of a potential buyer of the data segment.

Example 7 includes the subject matter of any of Examples 1-6, wherein offering the data segment for purchase at the offer price is performed in response to receiving the query for purchasing the data segment.

Example 8 is a method for exchanging data between a data aggregator and a data consumer, the method comprising: receiving, by a processor-based system and from a data aggregator server, an arbitrary data segment including data generated by a plurality of users and aggregated from one or more data sources, each of the users associated with one or more features that are represented in the data of the data segment; calculating, by the processor-based system, a value of the data segment based at least in part on the one or more features represented in the data of the data segment and an additive gaussian noise, wherein the value of the data segment is calculated by calculating an individual user value for each user represented in the data segment based on the user features represented in the data segment attributable to that user, plus the additive gaussian noise, the additive gaussian noise representing one or more unobserved characteristics of the data consumer; and calculating the value of the data segment by summing the individual user values; calculating, by the processor-based system, an offer price for the data segment as a function of the calculated value of the data segment and a statistical expected value of revenue from a sale of the data segment; receiving, by the processor-based system and from a data consumer server, a query for purchasing the data segment; sending, by the processor-based system and responsive to the query, the calculated offer price to the data consumer server; receiving, by the processor-based system, a request from the data consumer server to purchase the data segment at the calculated offer price; and sending, by the processor-based system, the data segment to the data consumer server responsive to receiving the request to purchase the data segment.

Example 9 includes the subject matter of Example 8, further comprising updating, by the processor-based system, the calculated value of the data segment based at least in part on the calculated offer price and the request from the data consumer server to purchase the data segment at the calculated offer price, and wherein the updating includes weighting the one or more features represented in the data of the data segment with a multivariate normal distribution using a Laplace approximation.

Example 10 includes the subject matter of Examples 8 or 9, wherein the plurality of users includes a first user and a second user, and the one or more data sources includes a first data source and a second data source, and wherein the data segment includes a first portion of data from the first data source that includes data of the first user, and a second portion of data from the second data source that includes data of the second user, the first and second data sources being different companies.

Example 11 includes the subject matter of any of Examples 8-10, wherein the calculating of the offer price is further based on a price that maximizes the statistical expected value of revenue from the sale of the data segment.

Example 12 includes the subject matter of any of Examples 8-11, wherein the one or more features represented in the data of the data segment include one or more of age, education, gender, marital status, and income.

Example 13 includes the subject matter of any of Examples 8-12, wherein the individual user value is a weighted sum of the user features represented in the data segment attributable to that user, plus the additive gaussian noise.

Example 14 is a system for exchanging data between data aggregators and data consumers, the system comprising: a storage; and at least one processor operatively coupled to the storage, the at least one processor configured to execute instructions stored in the storage that when executed cause the at least one processor to receive, from a data aggregator computing device, a data segment including data generated by one or more users and aggregated from one or more data sources, each of the users associated with one or more features that are represented in the data of the data segment; calculate a value of the data segment based at least in part on the one or more features represented in the data of the data segment and an additive gaussian noise, wherein the value of the data segment is calculated by calculating an individual user value for each user represented in the data segment based on the user features represented in the data segment attributable to that user, plus the additive gaussian noise; and calculating the value of the data segment by summing the individual user values; calculate an offer price for the data segment as a function of the calculated value of the data segment and a statistical expected value of revenue from a sale of the data segment; receive, from a data consumer computing device, a query for purchasing the data segment; send, responsive to the query, the calculated offer price to the data consumer computing device; receive a request from the data consumer computing device to purchase the data segment at the calculated offer price; and send the data segment to the data consumer computing device responsive to receiving the request to purchase the data segment.

Example 15 includes the subject matter of Example 14, wherein the at least one processor is further configured to update the calculated value of the data segment based at least in part on the calculated offer price and the request from the data consumer server to purchase the data segment at the calculated offer price.

Example 16 includes the subject matter of Examples 14 or 15, wherein the at least one processor updates the calculated value of the data segment by weighting the one or more features represented in the data of the data segment with a multivariate normal distribution using a Laplace approximation.

Example 17 includes the subject matter of any of Examples 14-16, wherein the plurality of users includes a first user and a second user, and the one or more data sources includes a first data source and a second data source, and wherein the data segment includes a first portion of data from the first data source that includes data of the first user, and a second portion of data from the second data source that includes data of the second user, the first and second data sources being different companies.

Example 18 includes the subject matter of any of Examples 14-17, wherein the at least one processor calculates the offer price in response to receiving the query for purchasing the data segment.

Example 19 includes the subject matter of any of Examples 14-18, wherein the individual user value is a weighted sum of the user features represented in the data segment attributable to that user, plus the additive gaussian noise.

Example 20 includes the subject matter of any of Examples 14-19, wherein the at least one processor calculates the offer price based on a price that maximizes the statistical expected value of revenue from the sale of the data segment.

Example 21 is a computer program product including one or more non-transitory machine-readable mediums encoded with instructions that when executed by one or more processors cause a process to be carried out for pricing arbitrary data segments, the process comprising: receiving an arbitrary data segment, the data segment including data generated by a plurality of users and aggregated from one or more data sources, each of the users associated with one or more features that are represented in the data of the data segment; calculating an individual user value for each user represented in the data segment, wherein an individual user value is a function of the user features represented in the data segment attributable to that user, plus an additive gaussian noise, wherein the additive gaussian noise represents one or more unobserved characteristics of a potential buyer of the data segment; calculating a value of the data segment by summing the individual user values; calculating an offer price for the data segment as a function of the calculated value of the data segment and a statistical expected value of revenue from a sale of the data segment; and in response to receiving a query for purchasing the data segment, offering the data segment for purchase at the calculated offer price based on the calculated value of the data segment.

Example 22 includes the subject matter of Example 21, the process further comprising: updating the calculated value of the data segment based at least in part on the calculated offer price, wherein the updating includes weighting the one or more features represented in the data of the data segment with a multivariate normal distribution using a Laplace approximation.

Example 23 includes the subject matter of Examples 21 or 22, wherein the calculating of the calculated offer price is further based on a price that maximizes the statistical expected value of revenue from the sale of the data segment.

Example 24 includes the subject matter of any of Examples 21-23, wherein the plurality of users includes a first user and a second user, and the one or more data sources includes a first data source and a second data source, and wherein the data segment includes a first portion of data from the first data source that includes data of the first user, and a second portion of data from the second data source that includes data of the second user, the first and second data sources being different companies.

Example 25 includes the subject matter of any of Examples 21-24, wherein the individual user value is a weighted sum of the user features represented in the data segment attributable to that user, plus the additive gaussian noise.

Example 26 includes the subject matter of any of Examples 21-25, wherein the individual user value is computed with one or more neural networks as a non-linear function of the user features represented in the data segment attributable to that user, plus the additive gaussian noise.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A computer program product including one or more non-transitory machine-readable mediums encoded with instructions that when executed by one or more processors cause a process to be carried out for pricing arbitrary data segments, the process comprising:
    receiving an arbitrary data segment that includes data generated by a plurality of users and aggregated from one or more data sources, wherein each of the users is associated with one or more features that are represented in the data of the arbitrary data segment;
    calculating an individual user value for each user represented in the arbitrary data segment, wherein the individual user value is a weighted sum of (a) the user features represented in the arbitrary data segment attributable to that user and (b) an additive gaussian noise;
    calculating a value of the arbitrary data segment by summing the individual user values; and
    offering the arbitrary data segment for purchase at an offer price based on the calculated value of the arbitrary data segment.

2. The computer program product of claim 1, wherein the process further comprises calculating the offer price for the arbitrary data segment as a function of (a) the calculated value of the arbitrary data segment and (b) a statistical expected value of revenue from a sale of the arbitrary data segment.

3. The computer program product of claim 2, wherein:
    the process further comprises updating the calculated value of the arbitrary data segment based at least in part on the calculated offer price; and
    updating the calculated value of the arbitrary data segment includes weighting the one or more features represented in the data of the arbitrary data segment with a multivariate normal distribution using a Laplace approximation.

4. The computer program product of claim 2, wherein the calculated offer price maximizes the statistical expected value of revenue from the sale of the arbitrary data segment.

5. The computer program product of claim 1, wherein:
    the plurality of users includes a first user and a second user;
    the one or more data sources includes a first data source and a second data source;
    the arbitrary data segment includes (a) a first portion of data from the first data source that includes data of the first user and (b) a second portion of data from the second data source that includes data of the second user; and
    the first and second data sources correspond to different entities.

6. The computer program product of claim 1, wherein the arbitrary data segment is offered for purchase at the offer price in response to receiving a query for purchasing the arbitrary data segment.

7. A method for exchanging data between a data aggregator and a data consumer, the method comprising:
    receiving, by a processor-based system and from a data aggregator server, a data segment that includes data generated by a plurality of users and aggregated from one or more data sources, wherein each of the users is associated with one or more features that are represented in the data of the data segment;
    calculating, by the processor-based system, a value of the data segment based at least in part on the one or more features represented in the data of the data segment and an additive gaussian noise, wherein the value of the data segment is calculated by
        calculating an individual user value for each user represented in the data segment based on (a) the user features represented in the data segment attributable to that user and (b) the additive gaussian noise, and
        summing the individual user values; and
    calculating, by the processor-based system, an offer price for the data segment as a function of the calculated value of the data segment and a statistical expected value of revenue from a sale of the data segment.

8. The method of claim 7, further comprising:
    receiving, by the processor-based system and from a data consumer server, a query for purchasing the data segment;
    sending, by the processor-based system and responsive to the query, the calculated offer price to the data consumer server;

receiving, by the processor-based system, a request from the data consumer server to purchase the data segment at the calculated offer price; and sending, by the processor-based system, the data segment to the data consumer server responsive to receiving the request to purchase the data segment.

9. The method of claim 8, further comprising updating, by the processor-based system, the calculated value of the data segment based at least in part on the calculated offer price and the request from the data consumer server to purchase the data segment at the calculated offer price, wherein updating the calculated value of the data segment includes weighting the one or more features represented in the data of the data segment with a multivariate normal distribution using a Laplace approximation.

10. The method of claim 7, wherein:
the plurality of users includes a first user and a second user;
the one or more data sources includes a first data source and a second data source;
the data segment includes (a) a first portion of data from the first data source that includes data of the first user, and (b) a second portion of data from the second data source that includes data of the second user; and
the first and second data sources are different entities.

11. The method of claim 7, wherein the calculated offer price maximizes the statistical expected value of revenue from the sale of the data segment.

12. The method of claim 7, wherein the one or more features represented in the data of the data segment include one or more of age, education, gender, marital status, and income.

13. The method of claim 7, further comprising:
receiving, by the processor-based system and from a data consumer server, a query for purchasing the data segment; and
sending, by the processor-based system and responsive to the query, the calculated offer price to the data consumer server.

14. A system for exchanging data between data aggregators and data consumers, the system comprising:
a storage; and
at least one processor operatively coupled to the storage, the at least one processor configured to execute instructions stored in the storage that when executed cause the at least one processor to
receive, from a data aggregator computing device, a data segment that includes data generated by a plurality of users and aggregated from one or more data sources, wherein each of the users is associated with one or more features that are represented in the data of the data segment,
calculate a value of the data segment based at least in part on the one or more features represented in the data of the data segment and an additive gaussian noise, wherein the value of the data segment is calculated by
calculating an individual user value for each user represented in the data segment based on (a) the user features represented in the data segment attributable to that user and (b) the additive gaussian noise, and
summing the individual user values, and
calculate an offer price for the data segment as a function of the calculated value of the data segment and a statistical expected value of revenue from a sale of the data segment.

15. The system of claim 14, wherein the at least one processor is further configured to:
receive, from a data consumer computing device, a query for purchasing the data segment;
send, responsive to the query, the calculated offer price to the data consumer computing device;
receive, from the data consumer computing device, a request to purchase the data segment at the calculated offer price; and
send the data segment to the data consumer computing device in response to receiving the request to purchase the data segment.

16. The system of claim 15, wherein the at least one processor is further configured to update the calculated value of the data segment based at least in part on the calculated offer price and the request from the data consumer server to purchase the data segment at the calculated offer price.

17. The system of claim 15, wherein the at least one processor calculates the offer price in response to receiving the query for purchasing the data segment.

18. The system of claim 14, wherein:
the plurality of users includes a first user and a second user;
the one or more data sources includes a first data source and a second data source;
the data segment includes (a) a first portion of data from the first data source that includes data of the first user, and (b) a second portion of data from the second data source that includes data of the second user; and
the first and second data sources correspond to different entities.

19. The system of claim 14, wherein the calculated offer price maximizes the statistical expected value of revenue from the sale of the data segment.

20. The system of claim 14, wherein the at least one processor is further configured to:
receive, from a data consumer computing device, a query for purchasing the data segment; and
send, responsive to the query, the calculated offer price to the data consumer computing device.

* * * * *